(12) United States Patent
Kumar et al.

(10) Patent No.: US 9,778,750 B2
(45) Date of Patent: Oct. 3, 2017

(54) HAND-GESTURE-BASED REGION OF INTEREST LOCALIZATION

(71) Applicant: Xerox Corporation, Norwalk, CT (US)

(72) Inventors: Jayant Kumar, Webster, NY (US); Xiaodong Yang, New York, NY (US); Qun Li, Webster, NY (US); Edgar A. Bernal, Webster, NY (US); Raja Bala, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 70 days.

(21) Appl. No.: 14/501,284

(22) Filed: Sep. 30, 2014

(65) Prior Publication Data

US 2016/0091975 A1 Mar. 31, 2016

(51) Int. Cl.
| | |
|---|---|
| *G09G 5/00* | (2006.01) |
| *G06F 3/01* | (2006.01) |
| *H04N 5/232* | (2006.01) |
| *G06K 9/00* | (2006.01) |
| *G06F 1/16* | (2006.01) |
| *G06F 3/03* | (2006.01) |
| *G02B 27/01* | (2006.01) |

(52) U.S. Cl.
CPC .......... *G06F 3/017* (2013.01); *G02B 27/0172* (2013.01); *G06F 1/163* (2013.01); *G06F 3/011* (2013.01); *G06F 3/0304* (2013.01); *G06K 9/00664* (2013.01); *H04N 5/23219* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC .......... G06F 3/005; G06F 3/011–3/014; G06F 3/017; G02B 2027/0138; G02B 2027/017; G02B 2027/0178; G02B 27/01; G02B 27/017; G01C 21/3602; G06T 19/006; H04N 5/23219
See application file for complete search history.

(56) References Cited

U.S. PATENT DOCUMENTS

| | | | |
|---|---|---|---|
| 7,142,191 B2 | 11/2006 | Idesawa | |
| 8,203,605 B1 | 6/2012 | Starner | |
| 8,558,759 B1 | 10/2013 | Prada Gomez et al. | |
| 8,686,943 B1* | 4/2014 | Rafii | G06F 3/0304 345/158 |
| 2008/0168403 A1* | 7/2008 | Westerman | G06F 3/04883 715/863 |
| 2009/0102788 A1* | 4/2009 | Nishida | G06F 3/014 345/158 |
| 2009/0110235 A1* | 4/2009 | Marti | G06F 3/011 382/103 |
| 2010/0226535 A1 | 9/2010 | Kimchi | |
| 2012/0249741 A1 | 10/2012 | Maciocci | |

(Continued)

*Primary Examiner* — Roberto Flores

(57) ABSTRACT

A method, non-transitory computer readable medium, and apparatus for localizing a region of interest using a hand gesture are disclosed. For example, the method acquires an image containing the hand gesture from the ego-centric video, detects pixels that correspond to one or more hands in the image using a hand segmentation algorithm, identifies a hand enclosure in the pixels that are detected within the image, localizes a region of interest based on the hand enclosure and performs an action based on the object in the region of interest.

8 Claims, 6 Drawing Sheets

(56) References Cited

U.S. PATENT DOCUMENTS

| | | | |
|---|---|---|---|
| 2013/0021374 A1* | 1/2013 | Miao | G06F 3/011 345/633 |
| 2013/0127980 A1* | 5/2013 | Haddick | G06F 3/013 348/14.08 |
| 2013/0278631 A1* | 10/2013 | Border | G02B 27/017 345/633 |
| 2013/0293580 A1 | 11/2013 | Spivack | |
| 2013/0321462 A1* | 12/2013 | Salter | G06F 1/163 345/633 |
| 2014/0176350 A1* | 6/2014 | Niehsen | B62D 15/025 340/988 |
| 2014/0208275 A1* | 7/2014 | Mongia | G06F 3/14 715/863 |
| 2014/0225918 A1* | 8/2014 | Mittal | G06F 3/017 345/633 |
| 2014/0253429 A1* | 9/2014 | Dai | G06F 3/0304 345/156 |
| 2014/0267042 A1* | 9/2014 | Burr | G06F 3/017 345/168 |
| 2016/0124513 A1* | 5/2016 | Dal Zot | G06F 3/011 715/863 |
| 2016/0165154 A1* | 6/2016 | Shinomiya | G06F 3/017 348/164 |

\* cited by examiner

HAND-GESTURE-BASED REGION OF INTEREST LOCALIZATION

The present disclosure relates generally to detecting regions of interest in head-mounted video devices and, more particularly, to a method and apparatus for localizing a region of interest using a hand gesture.

BACKGROUND

Wearable devices are being introduced by various companies and are becoming more popular in what the wearable devices can do. One example of a wearable device is a head-mounted video device, such as, Google Glass®.

A critical capability with wearable devices, such as the head-mounted video device, is detecting a region of interest in a scene in real-time as a given activity is proceeding. As the population moves from traditional environmental cameras to mobile and wearable cameras, it becomes important to consider not only the accuracy of the method, but also the power and computing resource usage since the wearable devices may have very limited processing and computing resources. For example, the wearable devices are much smaller than traditional laptop computers and desktop computers and do not have room to accommodate high powered processors and a large amount of memory.

Some current methods that are used to detect a region of interest use anticipated shapes to detect a hand gesture. For example, the method may look to see if the image contains any shapes that match a predefined library of shapes. However, if the shape is not in the predefined library then the region of interest may not be detected. Moreover, such methods are computationally expensive due to the cost of sliding-window-based template matching, which is typically used, and therefore, are not suitable for wearable computing where power consumption is of critical concern.

SUMMARY

According to aspects illustrated herein, there are provided a method, a non-transitory computer readable medium, and an apparatus for localizing a region of interest using a hand gesture. One disclosed feature of the embodiments is a method that acquires an image containing the hand gesture from the ego-centric video, detects pixels that correspond to one or more hands in the image using a hand segmentation algorithm, identifies a hand enclosure in the pixels that are detected within the image, localizes a region of interest based on the hand enclosure and performs an action based on the object in the region of interest.

Another disclosed feature of the embodiments is a non-transitory computer-readable medium having stored thereon a plurality of instructions, the plurality of instructions including instructions which, when executed by a processor, cause the processor to perform an operation that acquires an image containing the hand gesture from the ego-centric video, detects pixels that correspond to one or more hands in the image using a hand segmentation algorithm, identifies a hand enclosure in the pixels that are detected within the image, localizes a region of interest based on the hand enclosure and performs an action based on the object in the region of interest.

Another disclosed feature of the embodiments is an apparatus comprising a processor and a computer readable medium storing a plurality of instructions which, when executed by the processor, cause the processor to perform an operation that acquires an image containing the hand gesture from the ego-centric video, detects pixels that correspond to one or more hands in the image using a hand segmentation algorithm, identifies a hand enclosure in the pixels that are detected within the image, localizes a region of interest based on the hand enclosure and performs an action based on the object in the region of interest.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer-readable medium and an apparatus for localizing a region of interest using a hand gesture. Current methods for detecting a region of interest use a database of predefined shapes. For example, the shapes created by a user's hand must be anticipated and predefined to be able to detect a region of interest.

In contrast, embodiments of the present disclosure detect a region of interest selected by a user by analyzing the pixels in the image to detect hand pixels of the user via a hand segmentation algorithm. Then enclosures within the hand pixels are identified and one of the enclosures is identified as a region of interest after a morphological operation is performed to remove potential false positives and false negatives and select an enclosure that satisfies some pre-defined criteria. For example, the criterion can include that the enclosure must be the closest to a center of a frame of a captured ego-centric video image.

Once the region of interest is properly identified, the object within the region of interest may be cropped and used to perform an action based on the object. For example, the embodiments of the present disclosure may be used for automatic license plate recognition to automatically fill out a ticket for law enforcement officials, initiating a tracking task of a person or vehicle within the region of interest, translating a sign selected within the region of interest, and the like.

Figure 1:
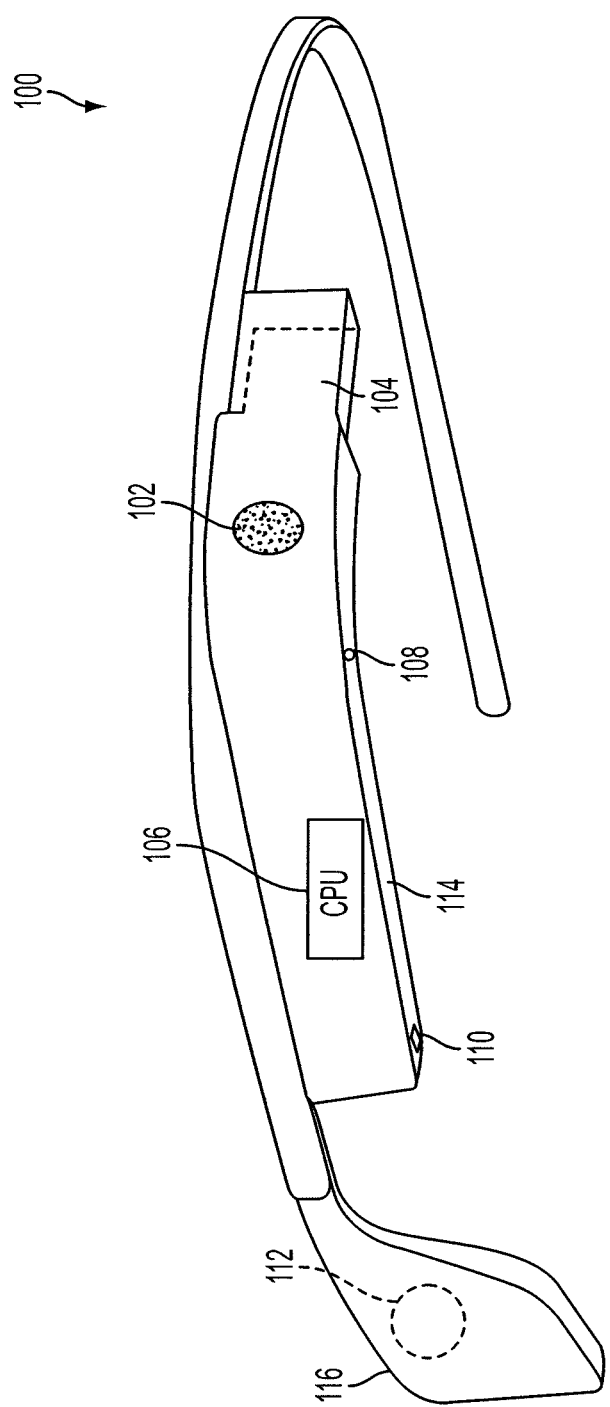
FIG. 1 illustrates a block diagram of head-mounted video device of the present disclosure.

FIG. 1 illustrates an example of a head-mounted video device 100 of the present disclosure. In one embodiment, the head-mounted video device 100 may be a device, such as for example, Google Glass®. In one embodiment, the head-mounted video device 100 may include a camera 102, a display 104, a processor 106, a microphone 108, one or more speakers 110 and a battery 112. In one embodiment, the processor 106, the camera microphone 108 and the one or more speakers 110 may be inside of or built into a housing 114. In one embodiment, the battery 112 may be inside of an arm 116.

It should be noted that FIG. 1 illustrates a simplified block diagram of the head-mounted video device 100. The head-mounted video device 100 may include other modules not shown, such as for example, a global positioning system (GPS) module, a memory, wireless connectivity, and the like.

In one embodiment, the camera 102 may be used to capture ego-centric video. In one embodiment, ego-centric video may be defined as video that is captured from a perspective of a user wearing the head-mounted video device 100. In other words, the ego-centric video is a view of what the user is also looking at.

In one embodiment, commands for the head-mounted video device 100 may be based on hand gestures. Ego-centric video that is captured by the camera 102 may contain a plurality of different objects in an image. For example, the video head-mounted video device 100 may have a difficult time figuring out which particular object the user is focusing on. In one embodiment, the present disclosure allows a user to enclose a particular object of interest to the user in a video frame using his or her hands. In other words, a region of interest may be selected by enclosing an object with a user's hand or hands. Once the region of interest is selected, an action may be automatically performed based on the object within the region of interest.

Figure 2:
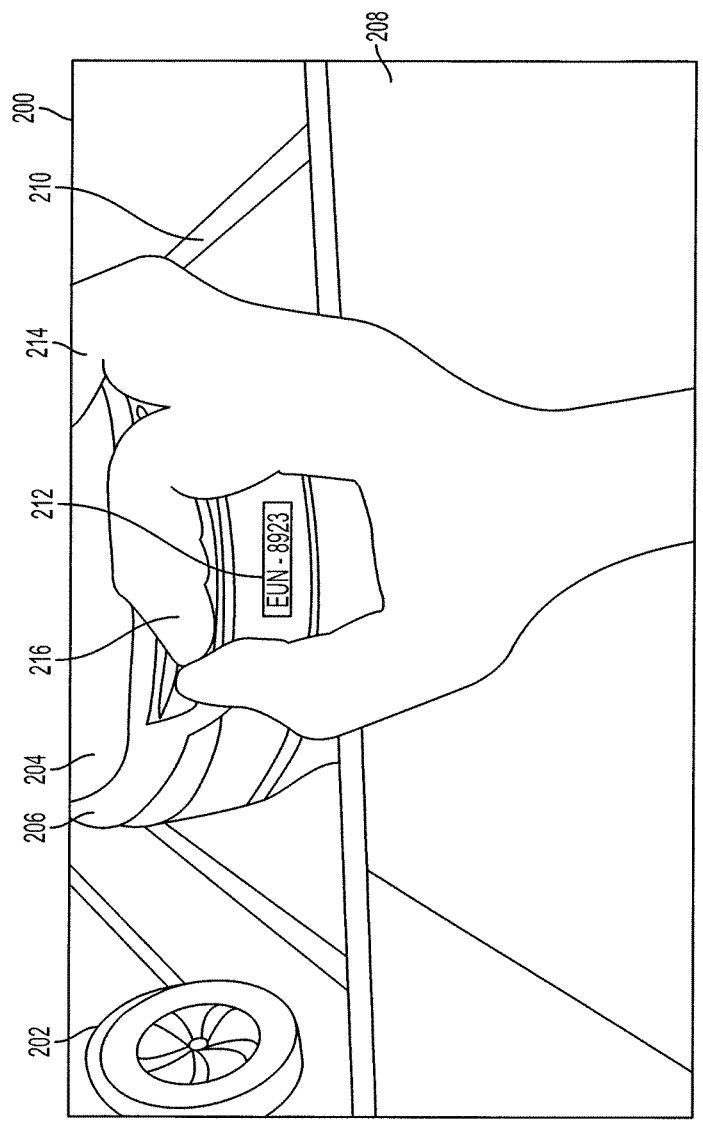
FIG. 2 illustrates an example frame of an ego-centric video frame captured from a head-mounted video device with a hand gesture indicating a region of interest.

FIG. 2 illustrates an example of a frame 200 of an ego-centric video image that was captured. The frame 200 contains a plurality of objects. For example, the frame 200 may contain a first car 202, a second car 204, a headlight 206 of the second car 204, a sidewalk 208, a white line 210, a license plate 212 of the second car 204, and the like. Currently, the head-mounted video device 100 would have no way of knowing which object the user is focusing on.

In one embodiment, a user may select a region of interest by creating an enclosure 216 with his or her hand 214 around a particular object in which the user is interested (e.g., the license plate 212). For example, the head-mounted video device 100 may detect the user is attempting to initiate a command when the hand is placed in front of the camera 102 and detected by the head-mounted video device 100 or any other method for initiating a hand gesture command may be used.

In one embodiment, the user may use one hand 214 or both hands 214. The user may create any shape of enclosure 216 with his or her hand or hands 214. For example, the enclosure 216 may be in the shape of a circle, a square, a rectangle, an oval, and the like. The only requirement is that the hand or hands 214 must form a complete or unbroken loop or perimeter around an object.

Figure 3:
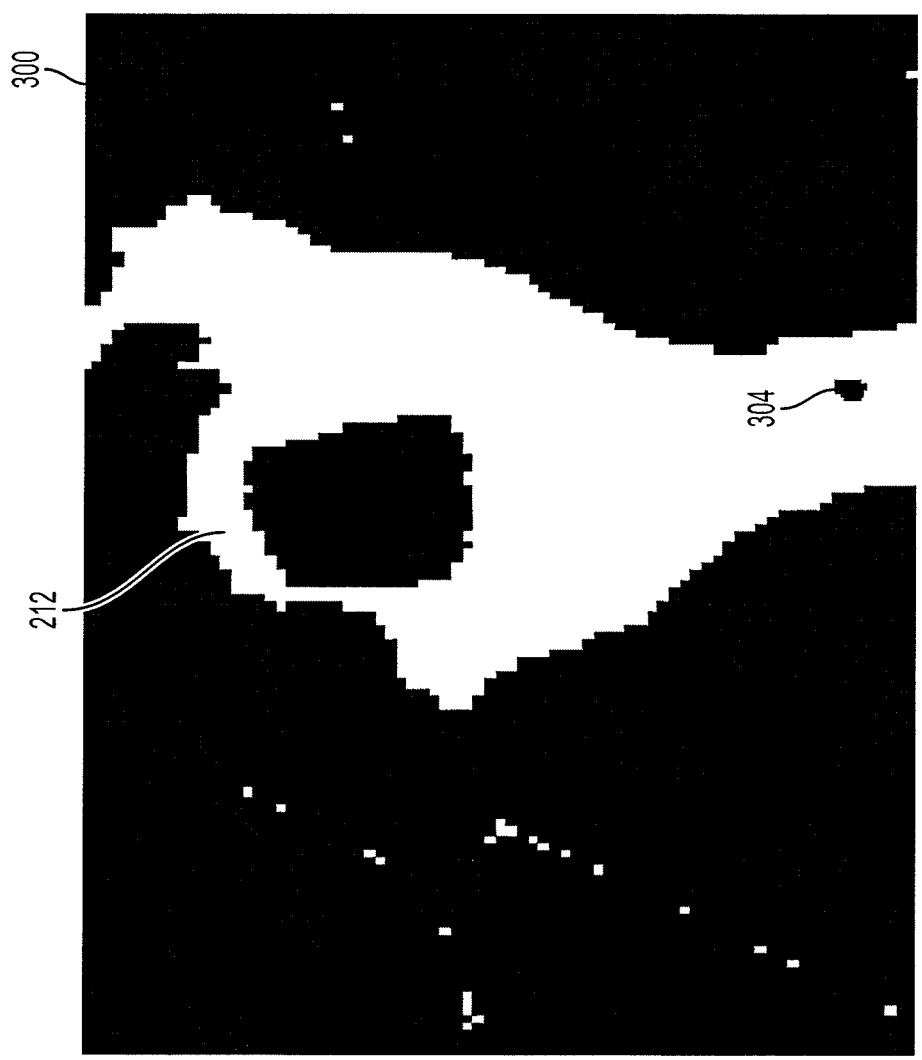
FIG. 3 illustrates a binary mask obtained by a hand segmentation module.

After the frame 200 is captured from the ego-centric video, the frame 200 may be analyzed via a hand segmentation algorithm to create a binary mask and detect the hand pixels within the frame 200. FIG. 3 illustrates an example binary mask 300 that is generated from the hand segmentation algorithm.

In one embodiment, the hand segmentation algorithm that may be used may be the methods described in co-pending application Ser. No. 14/501,250 filed on Sep. 30, 2014 that contents of which are incorporated by reference in its entirety. For example, the head-mounted video device 100 may be trained to detect hands and the characteristic or characteristics used to train the hand detection (e.g., an RGB color value of the hand pixels) may be used to identify the hand pixels in the binary mask 300 and the enclosure 216 formed by the user's hand 214 from FIG. 2.

However, the initial hand segmentation algorithm may contain some errors. For example, the errors may include false positive enclosures 304. As a result, image processing may be applied to the binary mask 300 to help reduce instances of potential false positives and false negatives, thus effectively reducing the probability of false positives and false negatives occurring. In one embodiment, the image processing may be a set of morphological operations that may include dilation, erosion, openings or closings to fill up some of the smaller hole structures and eliminate some of the smaller mask structures.

Figure 4:
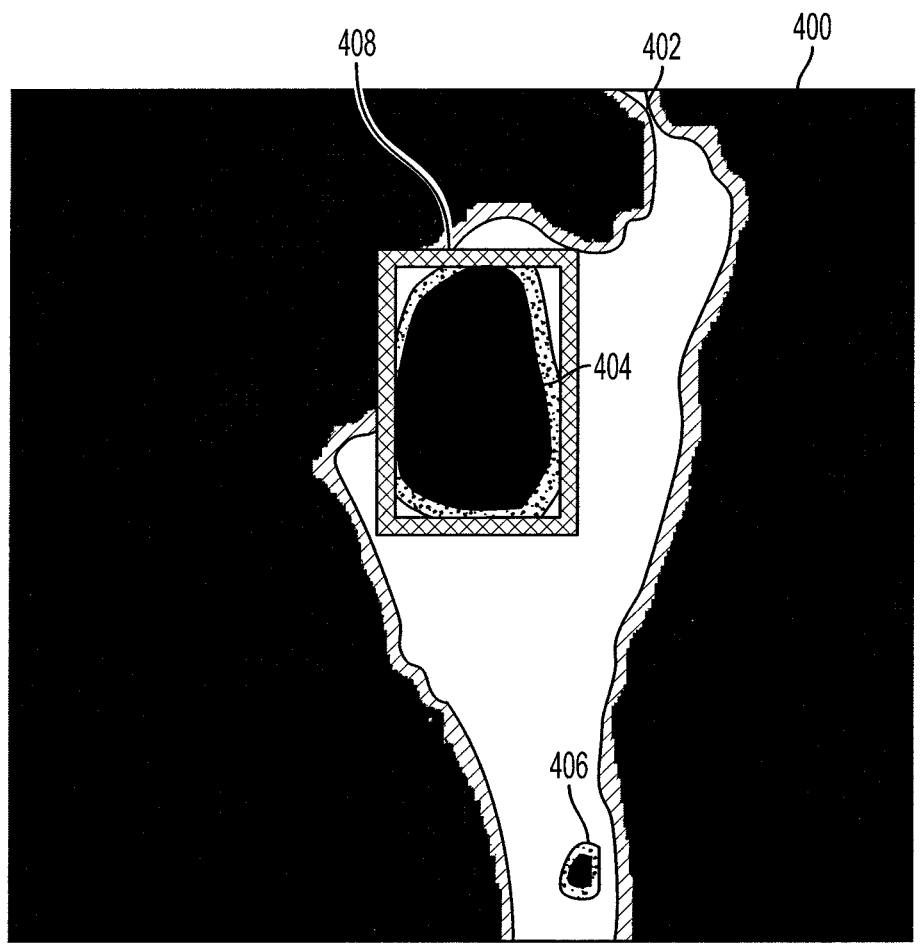
FIG. 4 illustrates a binary mask obtained after morphological operations.

In addition, the contours of the foreground region are detected and inner contours are distinguished from outer contours because the enclosure 216 can only be formed by inner contours. This is shown by example by the binary mask 400 illustrated in FIG. 4. For example, the pixels outside of the border 402 may be identified as the outer contours and the pixels within the border 402 may be identified as the inner contours.

After the inner contours are distinguished from the outer contours, the morphological operation may filter the enclosures (e.g., 212 and 304 in FIG. 3) to select the appropriate enclosure based on size and proximity to a center of the frame 200. For example, after filling the smaller holes and identifying the inner contours, the binary mask 300 contains two remaining inner contour holes 404 and 406. In another embodiment, after morphological filtering of the hand segmentation binary mask, a sub-region from the image completely enclosed by all hand pixels is identified and only inner contours are detected within this sub-region.

In one embodiment, the remaining inner contour holes 404 and 406 may be filtered by size. In one embodiment, an inner contour hole may be an enclosure if the inner contour hole is within a range of a ratio or a percentage of the frame 200. For example, a length of a diagonal of the hole may be divided by a length of a diagonal of the frame. In one embodiment, the diagonal may be defined as a longest cross-sectional dimension of the hole. If the ratio or percentage is within a predefined range, the hole may be the enclosure 216 created by the user's hand 214. In one embodiment, the pre-defined range may be a size percentage approximately between 15%-80% of the length of the diagonal of the frame 200.

In one embodiment, if multiple inner contour holes 404 and 406 are still remaining, then the inner contour hole of the inner contour holes 404 and 406 that is closest to a center of the frame 200 may be the enclosure 216. For example, if the center of the frame 200 is represented by coordinates ($X_{cen}$, $Y_{cen}$) and a center of the inner contour holes is ($X_i$, $Y_i$), then the inner contour holes with an absolute minimum distance $|Y_i-Y_{cen}|+|X_i-X_{cen}|$ is selected as the enclosure 216. For example, in the binary mask 400, the inner contour hole 404 has the appropriate size ratio or percentage and is closest to the center of the frame 200.

In one embodiment, once the enclosure 216 is identified a shape 408 may be fitted to the enclosure. For example, the shape 408 may be a circle, a rectangle, a square, a polygon, and the like. In one embodiment, the best fitting shape 408 may then be presented as an overlay onto the displayed image (e.g., the frame 200 in FIG. 2).

For example, referring back to FIG. 2, the shape 408 may be overlaid on top of the enclosure 216 formed by the user's hand 214. In one embodiment, the head-mounted video device 100 may ask for confirmation from the user that the shape 408 has correctly identified the region of interest selected by the enclosure 216.

In one embodiment, the head-mounted video device 100 may simply receive an input confirmation from the user when no action is taken. For example, the display 104 may indicate to the user that the shape 408 will be assumed to be the correct region of interest formed by the enclosure 216 if no input is received within a predefined period of time (e.g., within five seconds).

In another embodiment, the head-mounted video device 100 may wait for an input confirmation from the user. For example, the user may blink or provide a voice command (e.g., saying "yes" or "no") to indicate that the shape 408 is correctly or incorrectly located.

In one embodiment, if the shape 408 is correctly overlaid over a region of interest selected by the enclosure 216, the object within the region of interest may be cropped and an action may be automatically performed based o the object. For example, in FIG. 2, the license plate 212 may be cropped and an optical character recognition program may be applied to the license plate to read the alphanumeric text.

In one embodiment, the license plate number may be used to obtain driver information and one or more fields of a form (e.g., a parking ticket) may be automatically populated with information from obtained from the license plate 212 including the license plate number. In another embodiment, the license plate 212 may be cropped and read as part of an automatic license recognition program.

In another embodiment, the user may select a region of interest with an enclosure 216 that includes a person in a crowd or a moving vehicle in traffic. The person or vehicle may be identified and then automatically tracked. For example, the shape 408 may be fixed around the person or vehicle as the person or vehicle is moving and the user follows the person or vehicle.

In another embodiment, the user may select a region of interest with the enclosure that includes a sign in a foreign language. An optical character recognition program may be applied to read the text on the sign. A translation may be automatically performed and provided to the user.

As a result, the embodiments of the present disclosure provide a hand gesture detection algorithm for detecting a region of interested selected by an enclosure formed by the hand gesture and automatically performing an action based on an object in the region of interest. In one embodiment, the present disclosure performs a pixel analysis to first detect a hand in a frame of an ego-centric video image and then detects an enclosure. Notably, the embodiments of the present disclosure do not require a database of pre-defined shapes. As a result, the embodiments of the present disclosure may detect a region of interested selected by an enclosure formed by a user's hand or hands of any shape.

Figure 5:
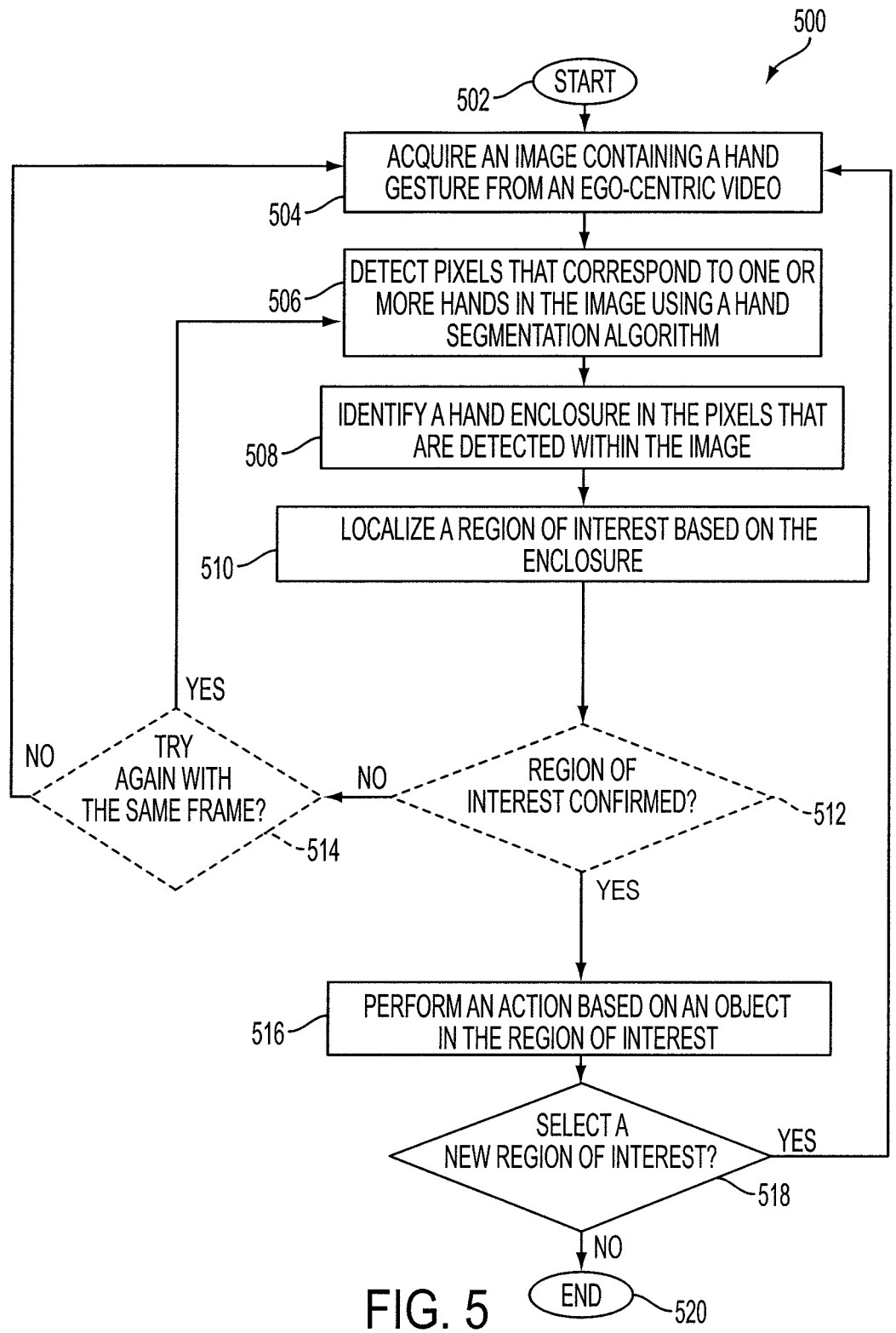
FIG. 5 illustrates an example flowchart of one embodiment of a method for localizing a region of interest using a hand gesture.

FIG. 5 illustrates a flowchart of a method 500 for localizing a region of interest using a hand gesture. In one embodiment, one or more steps or operations of the method 500 may be performed by the head-mounted video device 100 or a general-purpose computer as illustrated in FIG. 5 and discussed below.

At step 502 the method 500 begins. At step 504, the method 500 acquires an image containing the hand gesture from the ego-centric video. For example, a user may be attempting to perform a command via a hand gesture. The camera on the head-mounted video device may capture an ego-centric video of the user performing the hand gesture command (e.g., selecting a region of interest using an enclosure formed by the user's hand).

In one embodiment, the user may signal or prompt the initiation of the acquisition of the image from the ego-centric video. For example, the signal or prompt may be an audio command, a tap or a swipe gesture. After the prompt is received the image may be a still image or a frame captured from the ego-centric video.

At step 506, the method 500 detects pixels that correspond to one or more hands in the image using a hand segmentation algorithm. Any hand segmentation or detection algorithm may be used. One example hand segmentation algorithm that may be used is disclosed in co-pending application Ser. No. 14/501,250 filed on Sep. 30, 2014 that contents of which are incorporated by reference in its entirety. For example, the head-mounted video device may be trained to detect hands and the characteristic or characteristics used to train the hand detection (e.g., an RGB color value of the hand pixels) may be used to identify the hand pixels in a binary mask and the hand enclosure formed by the user's hand.

At step 508, the method 500 identifies a hand enclosure in the pixels that are detected within the image. For example, the binary mask that identifies the hand pixels from the hand segmentation algorithm may be used to identify one or more enclosures. In one embodiment, image processing may be used to filter one or more enclosures in the binary mask such that the correct enclosure is selected based on size and a proximity to a center of the frame. In one embodiment, the image processing may be a morphological operation, as described above.

At step 510, the method 500 localizes a region of interest based on the hand enclosure. For example, after the correct hand enclosure is detected, the area within the hand enclosure is localized as a region of interest that is of particular interest to the user. In other words, a portion of the image that is acquired from the ego-centric video is selected as the region of interest.

In one embodiment a shape may be fitted around the region of interest. In one embodiment, the shape may be a circle, a rectangle, a square, a polygon, and the like. In one embodiment, the shape may then be presented as an overlay onto the displayed image. In one embodiment, the object in the region of interest may be cropped.

At optional step 512, the method 500 determines if the region of interest is confirmed. For example, the shape around the region of interest may be displayed to a user in a wearable heads-up display. The user may then provide an input of confirmation that the shape is accurately around the region of interest the user was selecting using his or her hand or hands.

In one embodiment, the input confirmation may be a blink, a head movement, or a voice command (e.g., saying "yes" or "confirmed"). In another embodiment, the input confirmation may include no action being taken by the user. For example, the display may indicate that the region of interest is confirmed if no input is received in a predefined period of time (e.g., 5 seconds).

If the region of interest is not confirmed (e.g., the shape is not around the region of interest the user intended to select, the method 500 may proceed to optional step 514. At optional step 514, the method 500 may determine if the method 500 should try detecting the region of interest again with the same frame. For example, the user may request the head-mounted video device to try detecting the region of interest the user has selected again in the same video frame. If the answer is yes, the method may return to step 506 and steps 506-514 may be repeated.

If the answer to optional step 514 is no, the method 500 may return to step 504 or to acquire another image from the ego-centric video and steps 504-514 may be repeated. For example, the user may attempt to have the camera capture another ego-centric video of his or her hands to detect the user's hands selecting a region of interest.

Returning to optional step 512, if the region of interest is confirmed, then the method 500 may proceed to step 516. At step 516, the method 500 performs an action based on the object in the region of interest. In one embodiment, the action may be automatically filling out a form based on information in the object. For example, the user may enclose a region of interest around a license plate in the ego-centric video image. The license plate may be read to obtain information (e.g., wirelessly accessing a motor vehicle database via the head-mounted video device) associated with the license plate number and a citation for a traffic violation (e.g., a parking ticket, a speeding ticket, and the like) may be automatically filled out with the license plate number and the obtained information.

In another embodiment, the user may select a region of interest with an enclosure that includes a person in a crowd or a moving vehicle in traffic. The person or vehicle may be identified to initiate a tracking action. For example, the shape may be fixed around the person or vehicle as the person or vehicle is moving and the user follows the person or vehicle.

In another embodiment, the user may select a region of interest with the enclosure that includes a sign in a foreign language. An optical character recognition program may be applied to read the text on the sign. A translation may be automatically performed and provided to the user.

At step 518, the method 500 determines whether a new region of interest is to be selected. For example, the user may move his or her hands to another region of interest to the user. If user desires to select a new region of interest, the method 500 may return to step 504 to capture another ego-centric video and repeat the method 500 to detect the user's hands to localize a region of interest.

However, if a new region of interest is not to be selected, then method 500 may proceed to step 520. For example, the user may be done selecting regions of interest or the head-mounted video device may be turned off. At step 520, the method 500 ends.

As a result, the embodiments of the present disclosure improve the technological area of wearable devices by allowing the wearable devices, such as for example, head-mounted video devices to detect regions of interest selected by a user's hands. In addition, the video image is transformed into a command to perform an action.

It should be noted that although not explicitly specified, one or more steps, functions, or operations of the method 500 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 5 that recite a determining operation, or involve a decision, do not necessarily require that both branches of the determining operation be practiced. In other words, one of the branches of the determining operation can be deemed as an optional step.

Figure 6:
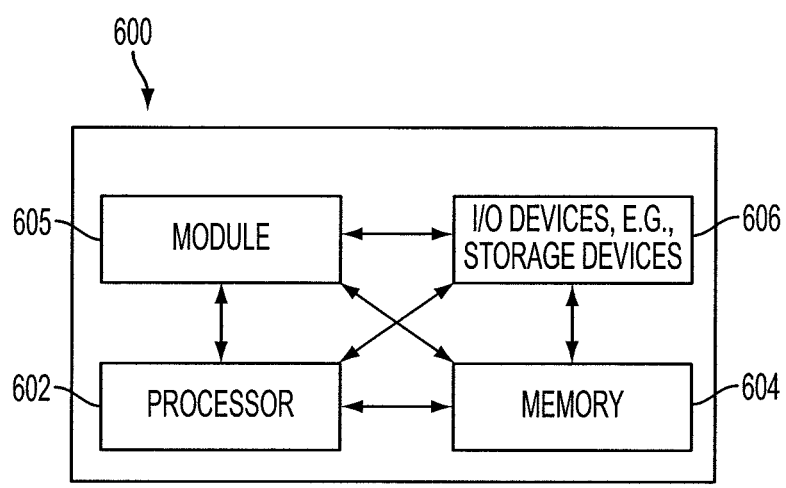
FIG. 6 illustrates a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises one or more hardware processor elements 602 (e.g., a central processing unit (CPU), a microprocessor, or a multi-core processor), a memory 604, e.g., random access memory (RAM) and/or read only memory (ROM), a module 605 for localizing a region of interest using a hand gesture, and various input/output devices 606 (e.g., storage devices, including but not limited to, a tape drive, a floppy drive, a hard disk drive or a compact disk drive, a receiver, a transmitter, a speaker, a display, a speech synthesizer, an output port and an input port). Although only one processor element is shown, it should be noted that the general-purpose computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for localizing a region of interest using a hand gesture (e.g., a software program comprising computer-executable instructions) can be loaded into memory 604 and executed by hardware processor element 602 to implement the steps, functions or operations as discussed above in connection with the exemplary method 500. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for localizing a region of interest using a hand gesture (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for localizing a region of interest in an ego-centric video using a hand gesture, comprising:
   acquiring, by a processor, an image containing the hand gesture from the ego-centric video;
   detecting, by the processor, pixels that correspond to one or more hands in the image using a hand segmentation algorithm;
   identifying, by the processor, a hand enclosure in the pixels that are detected within the image, wherein the identifying comprises:

generating, by the processor, a binary mask of the pixels that are detected within the image; and applying, by the processor, an image processing to the binary mask to reduce a probability of false positives and false negatives occurring in the binary mask, wherein the image processing comprises:

detecting, by the processor, a plurality of inner contour holes that are located within a border around the pixels that correspond to the one or more hands in the image from a plurality of contour holes within a frame that include a plurality of outer contour holes that are located outside of the border in the binary mask;

calculating, by the processor, a respective size percentage of each one of the plurality of inner contour holes, wherein the respective size percentage is calculated based on a length of a diagonal of a respective inner contour hole divided by a length of a diagonal of the frame;

eliminating, by the processor, one or more of the plurality of inner contour holes that have the respective size percentage that are outside of a predefined range of size percentages; and identifying, by the processor, a single inner contour hole from a remaining plurality of inner contour holes that is closest to a center of the frame as the hand enclosure;

localizing, by the processor, a region of interest based on the hand enclosure; and performing, by the processor, an action based on an object in the region of interest, wherein the object comprises text and the performing the action comprises:

recognizing, by the processor, the text using an optical character recognition program; and automatically populating, by the processor, one or more fields of a form using the text that is identified, wherein the text comprises alphanumeric text on a license plate and the form comprises a citation for a traffic violation.

2. The method of claim 1, wherein the acquiring comprises receiving a prompt to initiate the acquiring of the image, wherein the prompt comprises at least one of: an audio command, a tap or a swipe gesture.

3. The method of claim 2, wherein the acquiring further comprises capturing a still image after the prompt is received.

4. The method of claim 2, wherein the acquiring further comprises selecting a frame from the ego-centric video after the prompt is received.

5. The method of claim 1, further comprising:
displaying, by the processor, a shape around the region of interest in a display of a head-mounted video device; and
receiving, by the processor, a confirmation input that the shape correctly surrounds the region of interest.

6. The method of claim 1, further comprising:
translating, by the processor, the text in a first language to a second language.

7. A non-transitory computer-readable medium storing a plurality of instructions which, when executed by a processor, cause the processor to perform operations for localizing a region of interest using a hand gesture in an ego-centric video, the operations comprising:

acquiring an image containing the hand gesture from the ego-centric video;

detecting pixels that correspond to one or more hands in the image using a hand segmentation algorithm;

identifying a hand enclosure in the pixels that are detected within the image, wherein the identifying comprises:

generating a binary mask of the pixels that are detected within the image; and applying an image processing to the binary mask to reduce a probability of false positives and false negatives occurring in the binary mask, wherein the image processing comprises:

detecting a plurality of inner contour holes that are located within a border around the pixels that correspond to the one or more hands in the image from a plurality of contour holes within a frame that include a plurality of outer contour holes that are located outside of the border in the binary mask;

calculating a respective size percentage of each one of the plurality of inner contour holes, wherein the respective size percentage is calculated based on a length of a diagonal of a respective inner contour hole divided by a length of a diagonal of the frame;

eliminating one or more of the plurality of inner contour holes that have the respective size percentage that are outside of a predefined range of size percentages; and identifying a single inner contour hole from a remaining plurality of inner contour holes that is closest to a center of the frame as the hand enclosure;

localizing a region of interest based on the hand enclosure; and performing an action based on the object in the region of interest, wherein the object comprises text and the performing the action comprises:

recognizing the text using an optical character recognition program; and automatically populating one or more fields of a form using the text that is identified, wherein the text comprises alphanumeric text on a license plate and the form comprises a citation for a traffic violation.

8. A method for localizing a region of interest using a hand gesture, comprising:

capturing, by a processor, an ego-centric video using a head-mounted video device;

detecting, by the processor, one or more hands in a frame of the ego-centric video using a binary mask generated from a hand segmentation algorithm;

identifying, by the processor, a hand enclosure from a plurality of inner contour holes in the binary mask, wherein the identifying comprises:

applying, by the processor, an image processing to the binary mask to reduce a probability of false positives and false negatives occurring in the binary mask, wherein the image processing comprises:

detecting, by the processor, the plurality of inner contour holes that are located within a border of pixels around the one or more hands in the image from a plurality of contour holes within the frame that include a plurality of outer contour holes that are located outside of the border in the binary mask;

calculating, by the processor, a respective size percentage of each one of the plurality of inner contour holes, wherein the respective size percentage is calculated based on a length of a diagonal of a respective inner contour hole divided by a length of a diagonal of the frame;

eliminating, by the processor, one or more of the plurality of inner contour holes that have the respective size percentage that are outside of a predefined range of size percentages; and identifying, by the processor, a single inner contour hole from a remaining plurality of inner contour holes that is closest to a center of the frame as the hand enclosure;

determining, by the processor, a selecting a region of interest command is being initiated based on the hand enclosure that is identified;

localizing, by the processor, the region of interest based on the hand enclosure;

fitting, by the processor, a shape around the region of interest that is displayed as an overlay in a display of the head-mounted video device around the region of interest;

cropping, by the processor, an object in the region of interest; and performing, by the processor, an automated action based the object in the region of interest, wherein the object comprises text and the performing the automated action comprises:

recognizing, by the processor, the text using an optical character recognition program; and automatically populating, by the processor, one or more fields of a form using the text that is identified, wherein the text comprises alphanumeric text on a license plate and the form comprises a citation for a traffic violation.

* * * * *